United States Patent [19]
Budka

[11] Patent Number: 6,014,567
[45] Date of Patent: Jan. 11, 2000

[54] TECHNIQUE FOR BALANCING A COMMUNICATION LOAD IN A COMMUNICATION NETWORK

[75] Inventor: Kenneth Carl Budka, Marlboro, N.J.

[73] Assignee: Lucent Technologies Inc., Murray Hill, N.J.

[21] Appl. No.: 08/804,556

[22] Filed: Feb. 24, 1997

[51] Int. Cl.[7] .................................................. H04Q 7/20
[52] U.S. Cl. ...................... 455/453; 455/422; 455/466
[58] Field of Search .................................. 455/422, 432, 455/436, 450, 453, 464, 466, 509; 370/329, 341, 431

[56] References Cited

U.S. PATENT DOCUMENTS

| | | |
|---|---|---|
| 4,670,899 | 6/1987 | Brody et al. ............................. 455/436 |
| 5,241,685 | 8/1993 | Bodin et al. ............................. 455/453 |
| 5,404,392 | 4/1995 | Miller et al. ............................. 455/422 |
| 5,666,356 | 9/1997 | Fleming et al. ......................... 455/453 |
| 5,754,959 | 5/1998 | Ueno et al. .............................. 455/453 |
| 5,794,140 | 8/1998 | Sawyer .................................... 455/453 |
| 5,796,722 | 8/1998 | Kotzin et al. ............................ 455/453 |
| 5,799,154 | 8/1998 | Kuriyan .................................. 455/453 |
| 5,805,996 | 9/1998 | Salmela ................................... 455/453 |

*Primary Examiner*—Dwayne D. Bost
*Assistant Examiner*—Nay Maung

[57] ABSTRACT

In a communication network where a communication load imbalance is detected, the overburdened channels in the network are labeled congested to deter new-coming terminals from accessing such channels. In addition, messages are sent to selected terminals on the congested channels, commanding them to relocate from such channels to other uncongested channels. As a result, the load imbalance in the network is effectively reduced.

23 Claims, 4 Drawing Sheets

300

400

TECHNIQUE FOR BALANCING A COMMUNICATION LOAD IN A COMMUNICATION NETWORK

FIELD OF THE INVENTION

The invention relates to techniques for controlling a communication load in a communication network, and more particularly to a technique for balancing the load across communication channels in such a network.

BACKGROUND OF THE INVENTION

Cellular Digital Packet Data (CDPD) technology has emerged to utilize the pre-existing Advanced Mobile Phone Service (AMPS) networks to communicate data in a wireless manner. Mobile-end systems (MESs) incorporating the CDPD technology are capable of packaging data in small packets, accessing selected AMPS radio channels allocated for CDPD communications, and communicating the packets through the channels in bursts. Examples of such MESs include an automatic teller machine communicating transactional data, and a point-of-sale (POS) terminal communicating credit card data for verification thereof.

The CDPD channels constituting a CDPD network are shared by many MESs in a coverage area. A measure of a communication load on a CDPD channel is the number of the MESs using the channel at a given time. The performance of a balanced CDPD network with each channel having more or less the same communication load is superior to that of an unbalanced network with a few channels sustaining a disproportionately large load. This stems from the fact that balancing the load on each CDPD channel ensures that the capacity of each air link is utilized efficiently. In addition, as more and more MESs compete for air link bandwidth in the coverage area, the performance of a balanced network degrades more gracefully.

A prior art scheme for balancing the communication load in a CDPD network has been attempted. In accordance with this scheme, a hard limit is set on the number of MESs which can use a CDPD channel at a given time. However, despite this scheme, in practice all MESs in a coverage area occasionally end up using the same congested channel, leaving other channels unused.

Accordingly, there exists a need for an effective methodology to balance the communication load in a communication network to efficiently utilize the capacity of each channel in the network.

SUMMARY OF THE INVENTION

In accordance with the invention, the existence of a load imbalance in a communication network is determined based on factors including the number of channels in the network. In a preferred embodiment, in addition to using the number of terminals associated with a respective channel, the determination of the existence of the load imbalance is also based on the total number of terminals associated with the network channels relative to the number of such channels. In response to a load imbalance, those channels sustaining an excessive load are labeled unavailable, thereby deterring new-coming terminals from accessing such channels. In addition, selected terminals associated with overburdened channels are requested to move from those channels to other less burdened channels. As a result, the communication load in the network is effectively balanced, and the capacity of each channel is efficiently utilized.

DETAILED DESCRIPTION

Figure 1:
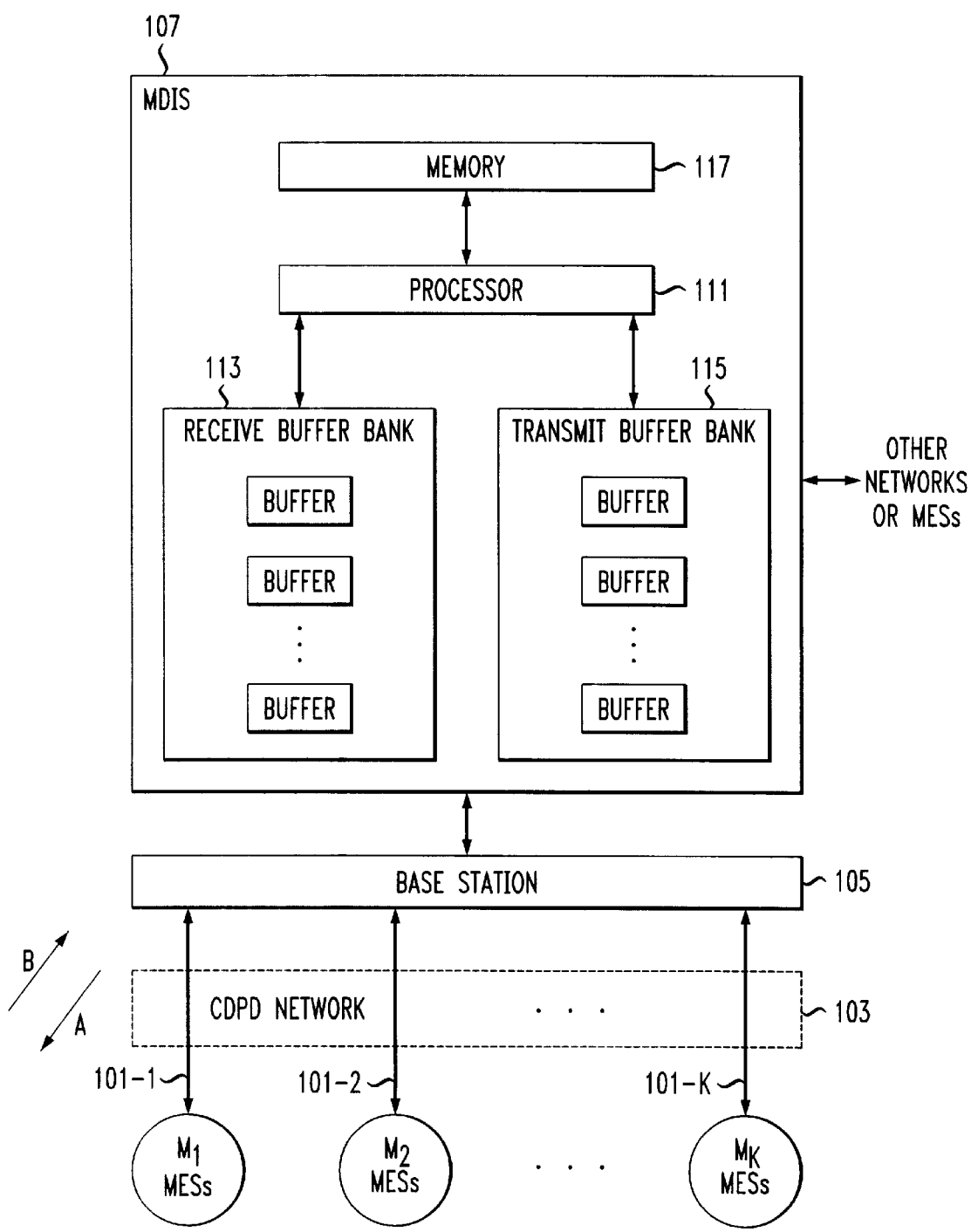
FIG. 1 illustrates a communications arrangement embodying the principles of the invention.

FIG. 1 illustrates communications arrangement 100 incorporating the principles of the invention. Illustratively, Cellular Digital Packet Data (CDPD) network 103 in arrangement 100 is a subset of a conventional Advanced Mobile Phone Service (AMPS) network (not shown). Network 103 includes a multiplicity of AMPS radio channels allocated by base station 105 to be used exclusively for data communications pursuant to the well known CDPD specification. These channels are hereinafter referred to as "Dedicated CDPD Channels". As shown in FIG. 1, arrangement 100 includes dedicated CDPD channels 101-1 through 101-K to serve a coverage area corresponding thereto, where K is an integer greater than one.

As also shown in FIG. 1, each channel is shared by a number of mobile-end systems (MESs) which may be active or inactive in transmitting and/or receiving data packets through the channel at a given time. Such MESs include, for example, automatic teller machines and point-of-sale (POS) terminals requiring data communications with remote computers. Specifically, the numbers of MESs served by channels 101-1 through 101-K are $M_1$ through $M_K$, respectively, where each of $M_1$ through $M_K$ is an integer greater than or equal to zero.

In a well known manner, data packets are communicated in blocks between MESs and base station 105 through each dedicated CDPD channel. After receiving the data blocks through the channel, base station 105 checks each block for transmission errors based on cyclic redundancy check (CRC) bits incorporated in the block. Retransmission of the block may be required when errors are detected. Otherwise, the data packets are extracted from the block and forwarded to mobile data intermediate system (MDIS) 107, along with information identifying the respective MESs from which the packets originated.

Among other things, MDIS 107 controls access of the MESs to CDPD network 103 and helps distribute the MESs being served evenly across channels 101-1 through 101-K, in accordance with the invention. In addition, MDIS 107 directs communication traffic in both forward direction A and reverse direction B. After receiving the data packets from base station 105 in reverse direction B, processor 111 in MDIS 107 stores the packets in receive buffer bank 113. The latter includes a multiplicity of buffers, each of which associated with a respective one of the MESs being served. Based on the above MES identification information, the received data packets are temporarily stored in the respective buffers associated with the originating MESs.

Depending on the destination address indicated on each stored packet, processor 111 in a well known manner directs the packet to the appropriate network (e.g., the Internet network) or MES to realize the data communication at least in reverse direction B.

In forward direction A, MDIS 107 receives from other networks or MESs data packets intended for the MESs served in the coverage area. Processor 111 stores the received data packets in transmit buffer bank 115. Similar to receive buffer bank 113, bank 115 includes a multiplicity of buffers, each of which is associated with a respective one of the MESs being served. Based on the destination address of each received packet, processor 111 temporarily stores the packet in the buffer associated with the MES identified by the destination address. In a well known manner, processor 111 then directs each stored packet to base station 105 where it is distributed to the appropriate MES, thereby realizing the data communication in the forward direction.

Before an MES can gain access to CDPD network 103, it scans the channels for a CDPD channel with suitable signal strength and block error rate. Once the MES finds such a CDPD channel, it listens for a channel identification message periodically broadcast on the channel stream. This channel identification message includes a code identifying a CDPD service provider, and a channel capacity flag indicating whether the channel stream has sufficient spare capacity to support new MESs. If the MES finds the CDPD service provider acceptable, the MES then checks the value of the channel capacity flag. If the flag indicates that the channel stream is congested, the MES regards the CDPD channel as unacceptable. Barring certain well known exceptions, the MES would not register on such a channel stream.

Otherwise, if the channel capacity flag indicates that the channel stream is uncongested, the MES attempts to register on the channel stream. If the registration is accepted by MDIS 107, the registration information including the identity of the MES and that of the channel stream is stored in memory 117. It should be noted at this point that a CDPD channel is recognizable by base station 105 as a physical radio channel while a CDPD channel stream is recognizable by MDIS 107 as contents in the CDPD channel. The information concerning the association of the channel stream with the corresponding CDPD channel is stored in base station 105.

A measure of the communication load on a CDPD channel is the number of the MESs using the channel at a given time. It is well known that the performance of a balanced CDPD network with each channel having more or less the same communication load is superior to that of an unbalanced network with a few channels sustaining a disproportionately large load. This stems from the fact that balancing the load on each CDPD channel ensures that the capacity of each air link is utilized efficiently. In addition, as more and more MESs compete for air link bandwidth in the coverage area, the performance of a balanced network degrades more gracefully.

In accordance with the invention, load balancing routine 300 involving a control of the channel capacity flag is devised to achieve an efficient utilization of the capacity of each channel in network 103. Specifically, routine 300 is designed to control the channel capacity flag to cause a roughly equal number of MESs to register on each CDPD channel stream in a coverage area. The steps constituting routine 300 are described in detail hereinbelow. However, the mechanics of routine 300 are well demonstrated by the following two examples illustrated in FIGS. 2A and 2B, respectively.

Figure 2A:
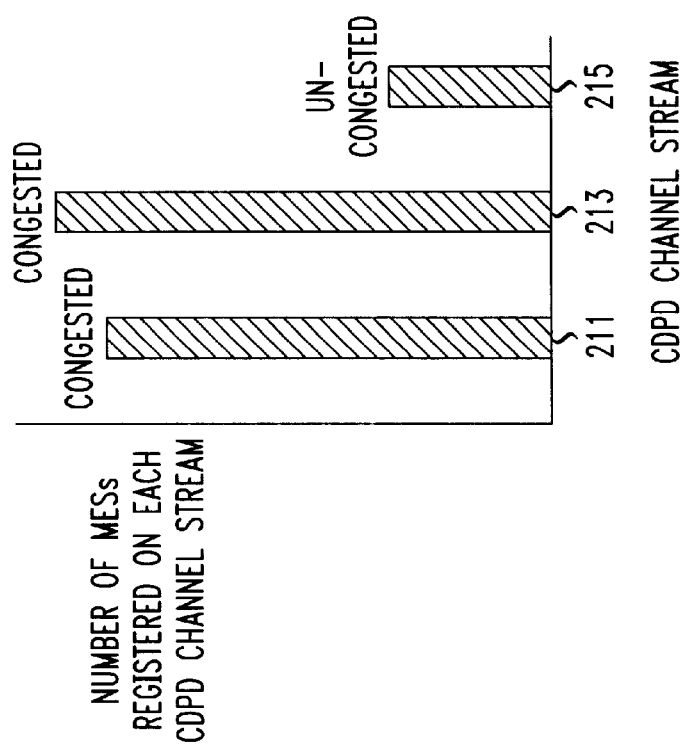
FIGS. 2A and 2B respectively illustrate two examples where efforts are made to balance the communication load in a communication network, in accordance with an inventive load balancing scheme.

FIG. 2A shows that the coverage area has three channel streams (thus K=3 in this instance), which are numerically denoted 201, 203 and 205, respectively. In this example, channel stream 203 has many more registered MESs than channel stream 201 or 205. To deter MESs from registering on stream 203 to control the imbalance, the channel capacity flag associated with stream 203 is marked "congested" while the flag associated with stream 201 or 205 is marked "uncongested", in accordance with the principles of load balancing routine 300.

Figure 2B:
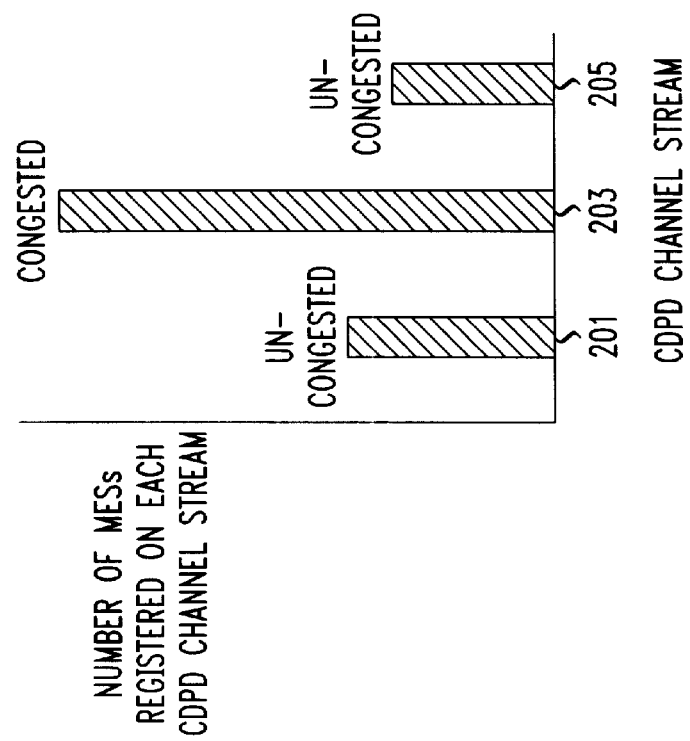

FIG. 2B shows that the coverage area now has three different channel streams (again K=3 in this instance), which are numerically denoted 211, 213 and 215, respectively. In this example, streams 211 and 213 have roughly the same number of MESs registered. However, each of those streams has many more registered MESs than stream 215. To deter MESs from registering on stream 211 or 213 to control the imbalance, the channel capacity flags associated with both streams 211 and 213 are marked "congested" while the flag associated with stream 215 is marked "uncongested," in accordance with the principles of load balancing routine 300.

Figure 3:
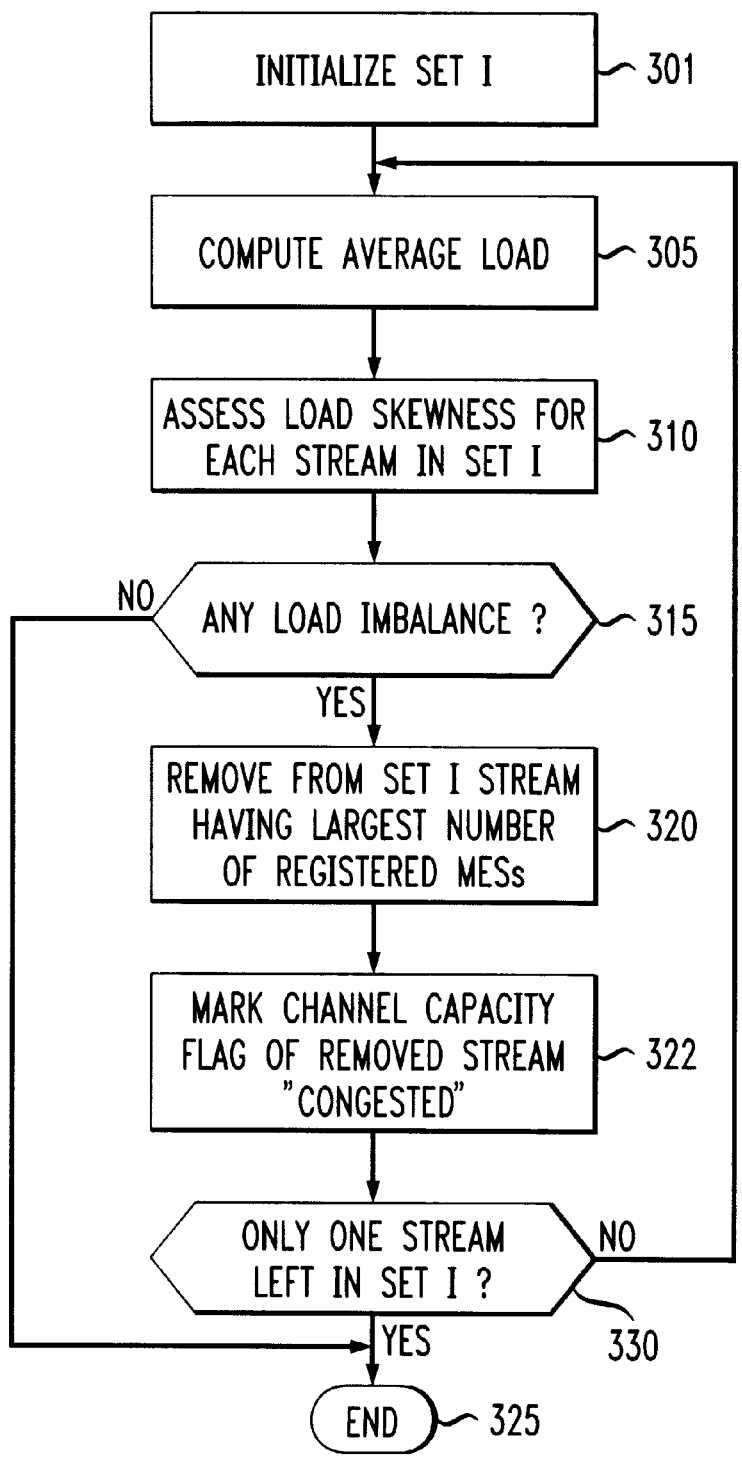
FIG. 3 is a flow chart depicting the steps of the inventive load balancing scheme.

FIG. 3 is a flow chart depicting the steps of load balancing routine 300 in accordance with the invention. This routine is invoked from time to time to observe the number of MESs registered on each channel stream, and help correct any load imbalance. The routine invocation times can be periodic or event driven (e.g., once every so many MES registrations). Based on how uneven the distribution of MESs registered on the channel streams is, a decision is made as to which channel streams should be indicated "congested" or "uncongested."

Routine 300, when invoked, instructs processor 111 in MDIS 107 to initialize set I, representing a set of uncongested CDPD channel streams, as indicated at step 301. To initialize set I, every channel stream in the coverage area (i.e., the stream of each of channels 101-1 through 101-K in this instance), regardless of the current status of its capacity control flag, is assigned to set I. Routine 300 then proceeds to step 305 where processor 111 computes an average load N, representing the average number of MESs registered on a channel stream in set I. In this illustrative embodiment, $N_I$ is obtained by dividing the total number of MESs registered on the channel streams in set I by the number of such channel streams. Processor 111 then assesses at step 310 load skewness for each stream i in set I by computing $|N_I - N_i|$, where $N_i$ represents the number of MESs registered on stream i. At step 315, processor 111 determines any load imbalance in network 103. This determination involves a comparison of the load skewness $|N_I - N_i|$ with a predetermined skew threshold α for each stream i, where α≧0. Thus, the skew threshold represents the load skewness tolerance of CDPD network 103.

If processor 111 determines that at least one stream in set I has load skewness exceeding the skew threshold, i.e., a load imbalance, routine 300 proceeds to step 320. Otherwise, routine 300 comes to an end, as indicated at step 325.

Processor 111 at step 320 removes, from set I, the channel stream having the largest number of MESs registered thereon, and at step 322 marks its channel capacity flag "congested." Processor 111 then checks at step 330 whether there is only one uncongested channel stream left in set I. If that is the case, routine 300 proceeds to step 325 and thereby comes to an end. Otherwise, routine 300 returns to step 305 previously described.

Pursuant to further aspects of the invention is second load balancing routine 400, which involves use of a standard channel switch message in a CDPD network. In accordance with the invention, this message is controllably initiated by processor 111 to command selected MESs to move from one channel stream onto another when a load imbalance in CDPD network 103 is detected. Unlike routine 300 which achieves the load balancing result by passively suggesting to new-coming MESs that certain streams are congested, routine 400 takes direct corrective actions, and can be used to rectify momentary traffic imbalances in network 103.

However, switching channels by an MES temporarily disrupts data transfer between the MES and the CDPD network. As a result of this disruption, the transmitted data packets would be delayed, and may even need to be retransmitted, thus affecting both network performance and efficiency. As such, routine 400 should be applied sparingly.

In accordance with routine 400, processor 111 monitors the flow of traffic on each CDPD channel stream during a measurement period, say, five seconds. During that period, processor 111 determines for each channel stream, which MESs are actively receiving data only (hereinafter "Type A MESs"), which are actively sending data only (hereinafter "Type B MESs"), which are both actively sending and receiving data (hereinafter "Type C MESs"), and which are quiescent (hereinafter "Type D MESs"). The following criteria (1) and (2) are illustratively used by processor 111 to determine whether an MES (say, MES j) is active or not in sending and/or receiving data:

(1) Processor 111 monitors the buffer associated with MES j in transmit buffer bank 115, and the cumulative number of data bytes $b_j^1$ buffered for transmission to MES j is recorded at the end of a measurement period. If $b_j^1 > R$, where R is a predetermined number, then MES j is actively receiving data. Otherwise it is not.

(2) Processor 111 monitors the buffers associated with all MESs (including MES j) registered on the same channel stream i as MES j in receive buffer bank 113, and the cumulative number of data bytes buffered for each MES registered on stream i is recorded at the end of the measurement period. If SUM>S, and $b_j^2 > a(MAX)$, then MES j is actively sending data, where SUM denotes a sum of the cumulative numbers of data bytes buffered for the respective MESs registered on stream i; S is a predetermined number; $b_j^2$ represents the cumulative number of data bytes buffered for MES j; MAX denotes the highest cumulative number of data bytes buffered for an MES registered on stream i; and $0 < a < 1$. Otherwise if SUM$\leq$S, or $b_j^2 \leq a$ (MAX), then MES j is not actively sending data.

Using criteria (1) and (2), processor 111 readily classifies each MES being served in the coverage area as an MES of type A (actively receiving only), type B (actively sending only), type C (actively receiving and sending) or type D (neither receiving nor sending).

Figure 4:
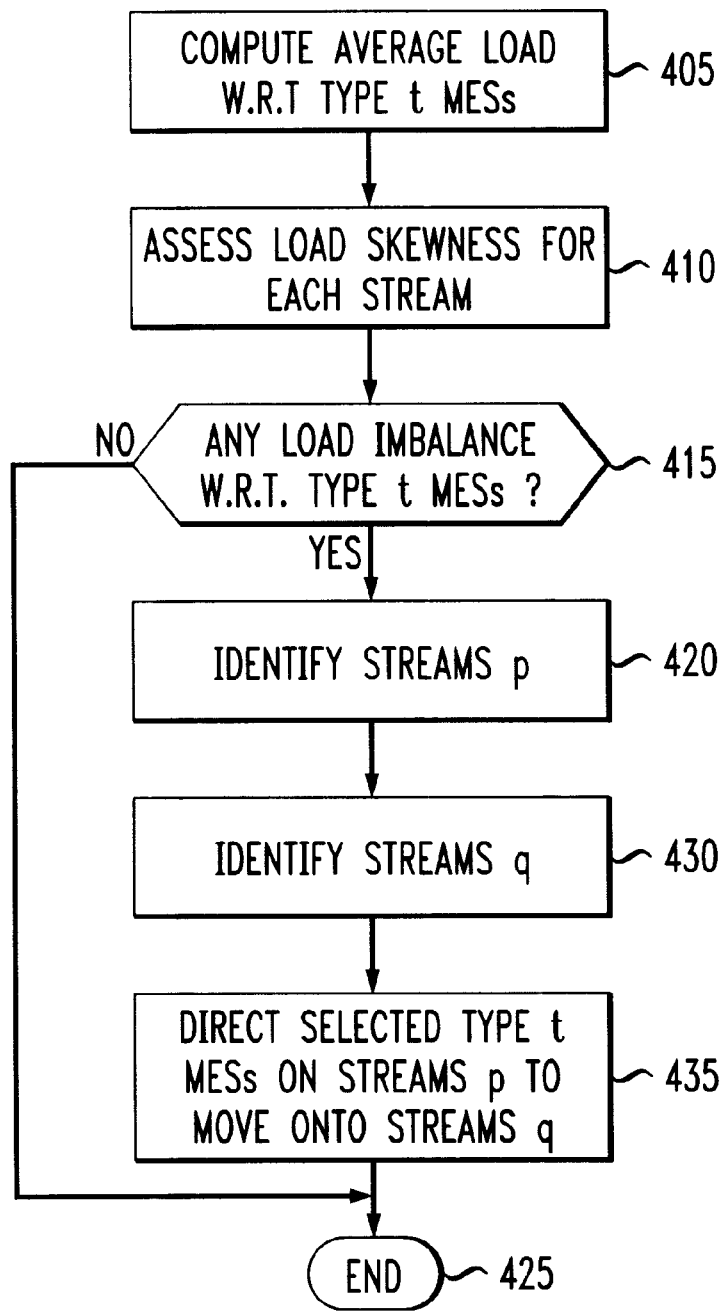
FIG. 4 is a flow chart depicting the steps of a second inventive load balancing scheme.

FIG. 4 is a flow chart depicting the steps of load balancing routine 400 in accordance with the invention. Routine 400 is stored in memory 117 in MDIS 107. Instructed by routine 400, for each type t (t=A, B, C or D) of MES, processor 111 first computes at step 405 an average load Nt, representing the average number of MESs of type t registered on a channel stream in the coverage area. In this illustrative embodiment, $N_t$ is obtained by dividing the total number of type t MESs registered on the channel streams in the coverage area by the number of such channel streams. Processor 111 then assesses at step 410 load skewness for each stream i with respect to type t MESs by computing $|n_i(t) - RND(N_t)|$, where $n_i(t)$ represents the number of type t MESs registered on stream i, and RND(x) is a conventional rounding function yielding the closest integer to x. At step 415, processor 111 determines any load imbalance in network 103 with respect to type t MESs. This determination involves a comparison of the load skewness $|n_i(t) - RND(N_t)|$ with a predetermined skew threshold $\alpha_t$ for each stream i, where $\alpha_t \geq 0$. Thus, the skew threshold represents the load skewness tolerance of CDPD network 103 with respect to type t MESs.

If processor 111 determines that at least one stream has load skewness exceeding the skew threshold, i.e., a load imbalance, routine 400 proceeds to step 420. Otherwise, routine 400 comes to an end, as indicated at step 425.

At step 420, processor 111 identifies each such stream p with $(n_p(t) - RND(N_t)) > 0$, from which up to $(n_p(t) - RND(N_t))$ of type t MESs are to be removed. Processor 111 then identifies at step 430 each such stream q with $(n_q(t) - RND(N_t)) < 0$, to which up to $(RND(N_t) - n_q(t))$ type t MESs are to be added. Routine 400 then proceeds to step 435 which is described in detail hereinbelow. It suffices to know for now that processor 111 at step 435 directs selected ones of type t MESs registered on streams p to move onto streams q, in an effort to achieve an even distribution of all the type t MESs in the coverage area across all the channel streams. To that end, processor 111 initiates standard switch channel messages to the selected type t MESs on streams p through base station 105. Each message commands a respective one of the selected MESs to relocate to a specified stream q. Barring certain well known exceptions, upon receipt of the switch channel message, the selected MES moves onto the specified stream q. Routine 400 ends at step 425.

Step 435 of routine 400 will now be further described. At step 435, the actual number of selected type t MESs to be removed from a stream p and that to be added to a stream q depend on the value of $RND(N_t)$ relative to that of $N_t$. Consider the first case where $RND(N_t) = N_t$. That is, $N_t$ is an integer. It can be shown that:

$$\sum_{All\ streams\ p} (n_p(t) - RND(N_t)) = \sum_{All\ streams\ q} (RND(N_t) - n_q(t)).$$

That is, there are as many "evictees" from streams p altogether as there are "shelters" on streams q as a whole. In this case, processor 111 directs $(n_p(t) - RND(N_t))$ selected type t MESs on each stream p to move onto ones of streams q. If every selected MES follows such a direction, each stream in the coverage area would have $RND(N_t) = N_t$ type t MESs.

In the second case where $RND(N_t) > N_t$, it can be shown that the number of "shelters" on streams q exceeds the number of "evictees" from streams p. Processor 111 at step 435 again directs $(n_p(t) - RND(N_t))$ selected type t MESs on each stream p to move onto ones of streams q. If every selected MES follows such a direction, most of the streams in the coverage area would have $RND(N_t)$ type t MESs and the remaining streams would have $(RND(N_t) - 1)$ type t MESs.

In the third case where $RND(N_t) < N_t$, it can be shown that there are more potential "evictees" from streams p than the "shelters" on streams q. Processor 111 at step 435 directs either $(n_p(t) - RND(N_t))$ or $(n_p(t) - RND(N_t) - 1)$ selected type t MESs on each stream p to move onto ones of streams q to fill all the "shelters" on streams q. Thus, if every selected MES follows such a direction, most of the streams in the coverage area would have $RND(N_t)$ type t MESs and the remaining streams would have $(RND(N_t) + 1)$ type t MESS.

The schemes used by processor 111 to select which type t MESs to be removed from a given stream p at step 435 include a random selection scheme, an ordered selection scheme, and a priority based selection scheme.

Specifically, in accordance with the random selection scheme, the type t MESs to be removed are selected at random. The ordered selection scheme is based on the time that the type t MESs were last commanded to move, and thus requires processor 111 to keep track of such time for each MES. Processor 111 selects the most recently relocated MES last. As a result, the selected MES would less likely experience an unfair share of channel switches. The priority based selection scheme requires assignment of a priority to each MES which may be based on its network address. In accordance with this scheme, processor 111 selects those MESs assigned the lowest priority to be moved first.

The foregoing merely illustrates the principles of the invention. It will thus be appreciated that a person skilled in the art will be able to devise numerous arrangements which, although not explicitly shown or described herein, embody the principles of the invention and are thus within its spirit and scope.

For example, in the disclosed embodiment, communications arrangement 100 includes a CDPD network. However, the invention broadly applies to any communications arrangement or network therein having a potential problem of communication load imbalance.

Finally, although arrangement 100 as disclosed is embodied in the form of various discrete functional blocks, the arrangement could equally well be embodied in a different arrangement in which the functions of any one or more of those blocks or indeed, all of the functions thereof, are realized, for example, by one or more appropriately programmed processors or devices.

I claim:

1. A communications arrangement including a plurality of terminals and a plurality of channels, the plurality of terminals using the plurality of channels to communicate information, the communications arrangement comprising:
   a processor for computing an average number of terminals using a channel, and at least a difference between the average number and the number of terminals using a selected one of the plurality of channels, a load imbalance among said channels being determined based on a comparison of at least the difference with a predetermined threshold; and
   a controller for influencing a choice of at least one terminal to use the selected channel to communicate information when the load imbalance is determined to exist.

2. The arrangement of claim 1 wherein said plurality of channels form part of a communication network.

3. The arrangement of claim 2 wherein said network includes a Cellular Digital Packet Data (CDPD) network.

4. The arrangement of claim 3 wherein at least one of said channels is an Advanced Mobile Phone Service (AMPS) channels.

5. The arrangement of claim 1 wherein the load imbalance is determined to exist when said difference exceeds said predetermined threshold.

6. The arrangement of claim 1 wherein said plurality of terminals are of a selected type.

7. The arrangement of claim 6 wherein each of the terminals of the selected type is a relatively active transmitter and relatively inactive receiver.

8. The arrangement of claim 6 wherein each of the terminals of the selected type is a relatively active receiver and relatively inactive transmitter.

9. The arrangement of claim 6 wherein each of the terminals of the selected type is an active transmitter and receiver.

10. The arrangement of claim 6 wherein each of the terminals of the selected type is presently inactive.

11. The arrangement of claim 1 wherein said controller indicates to said at least one terminal that the selected channel is unavailable.

12. The arrangement of claim 1 wherein said controller communicates a request to said at least one terminal for foregoing the selected channel being used thereby.

13. The arrangement of claim 1 wherein said controller communicates a request to said at least one terminal for using a different channel than the selected channel being used thereby.

14. The arrangement of claim 1 wherein said processor includes said controller.

15. A communication arrangement for use with a network providing a plurality of channels, the communication arrangement comprising:
   a plurality of terminals, said terminals being associated with ones of said channels;
   a processor for computing an average number of terminals associated with a channel;
   a monitor for determining the existence of a load imbalance in the network when the number of terminals associated with a selected one of said channels exceeds said average number by at least a threshold value; and
   a controller for taking an action in response to said load imbalance.

16. The arrangement of claim 15 wherein said threshold value is zero.

17. The arrangement of claim 15 wherein said plurality of terminals are of a selected type.

18. The arrangement of claim 15 wherein said action includes labeling said selected one of said channels unavailable.

19. The arrangement of claim 15 wherein said action includes communicating a request to at least one terminal currently associated with said selected one of said channels for removing the association of the terminal therefrom.

20. The arrangement of claim 15 wherein said processor includes said monitor and said controller.

21. A method for use in a communication network including a plurality of channels and a plurality of terminals, the plurality of terminals using the plurality of channels to communicate information, the method comprising:
   computing an average number of terminals using a channel, and at least a difference between the average number and the number of terminals using a selected one of the plurality of channels;
   determining a load imbalance among said channels based on a comparison of at least the difference with a predetermined threshold; and
   influencing a choice of at least one terminal to use the selected channel to communicate information when the load imbalance is determined to exist.

22. A method of claim 21 further comprising indicating to said at least one terminal that the selected channel is unavailable.

23. The method of claim 21 further comprising communicating a request to said at least one terminal for foregoing the selected channel being used thereby.

* * * * *